J. SCHROEDER.
GROUND ANCHOR.
APPLICATION FILED APR. 14, 1910.
995,297.
Patented June 13, 1911.
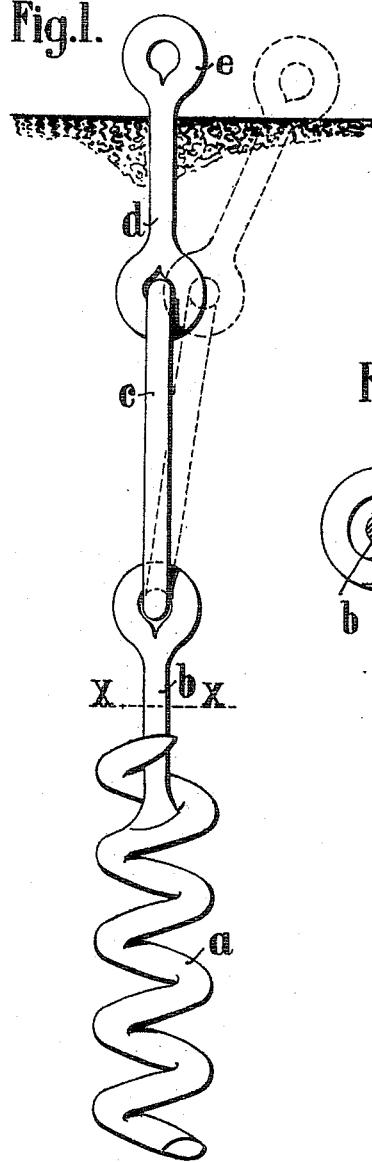
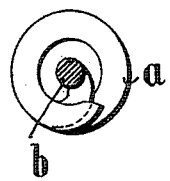
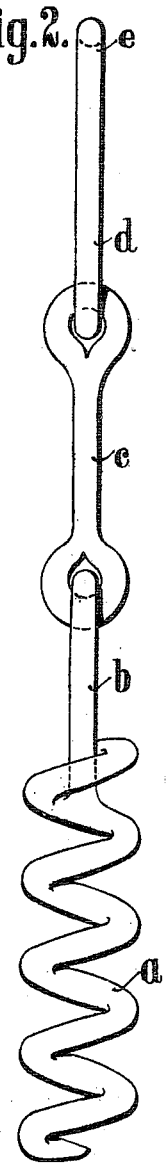
WITNESSES
INVENTOR
John Schroeder
BY
ATTORNEYS

UNITED STATES PATENT OFFICE.

JOHN SCHROEDER, OF OSCHERSLEBEN, GERMANY.

GROUND-ANCHOR.

995,297. Specification of Letters Patent. Patented June 13, 1911.

Application filed April 14, 1910. Serial No. 555,418.

*To all whom it may concern:*

Be it known that I, JOHN SCHROEDER, a citizen of the free city of Hamburg, Germany, and a resident of Oschersleben, Germany, have invented a new and Improved Ground-Anchor, of which the following is a full, clear, and exact description.

An object of my invention is to provide an anchor for removable connection with the ground and adapted to secure in place ropes, chains and the like, and my invention is more particularly adapted to secure balloon or airship sheds, and devices pertaining thereto.

For the purpose mentioned use is made of a screw and an extended member or shank connected to a convolution of the screw intermediate the ends of the screw, and linked members connected with the shank to permit a side motion without danger of bending the shank or screw, the upper linked member being adapted to project above the ground and provided with means whereby a rope, chain or the like can be secured to the member.

In the ground anchors now generally used, the shank is often seriously bent when the anchor is subjected to a heavy side pull or thrust, and in other anchors now in use it is impossible to remove the anchor from the ground after the same has been engaged therewith. In my ground anchor it is impossible to bend the shank or screw in any manner, the thrust or pull from the side being almost entirely absorbed by the linked members, and my device can be removed from the ground as easily and quickly as the anchor is disposed therein.

Reference is to be had to the accompanying drawings forming a part of this specification, in which similar characters of reference indicate corresponding parts in all the views, and in which—

Figure 1 is a side elevation of my device, showing the same disposed in the ground, the dotted lines indicating the position of the anchor when subjected to a side pull or thrust; Fig. 2 is a side elevation of my device, showing the means for connecting the linked members to each other and to the shank; and Fig. 3 is a sectional view of my device, taken on the line $x$—$x$ in Fig. 1, and disclosing the manner in which the shank is connected with the screw.

Referring more particularly to the figures, I provide a screw $a$ of any desirable spiral shape, and secured to one of the convolutions of the screw, intermediate its ends, is a shank $b$. The shank $b$ is preferably provided with a linked member $c$ secured to the shank $b$ by linking the member $c$ through an eye provided at one end of the shank $b$, and secured to the linked member $c$ is a second linked member $d$, engaging the member $c$ in a manner similar to the connection between the shank $b$ and the member $c$, with an eye $e$ in the member $d$ adapted to project above the ground as is conveniently shown in Fig. 1.

When disposing the device described, in the ground, the same is screwed into the ground similar to the way in which a screw is secured in wood, and to remove the device from the ground the reverse motion is practiced, or in other words, the device is unscrewed from the ground. The eye $e$ is provided on the member $d$ to receive and securely hold any rope, chain or the like, used as a brace for a shed, building, airship or the like. By providing the linked members $c$ and $d$, any possibility of bending or injuring the screw $a$ or shank $b$, is prevented, especially when a side thrust or pull is directed against the member $e$.

Although I have described my invention as shown, it will be understood that I do not limit myself to this particular construction, the scope of my invention being fully disclosed in the appended claims.

Having thus described my invention, I claim as new and desire to secure by Letters Patent:

1. A ground anchor, comprising a screw formed by a rod wound into the form of a helical line, and a central shank connected to a convolution of the screw intermediate its ends by means of a rod-portion extending from said convolution to the axis of the screw.

2. A ground anchor, comprising a screw, formed by a rod wound into the form of a helical line, and a central shank connected to a convolution of the screw intermediate its ends, the upper portion of said shank being composed of a plurality of linked members, in such a manner, that the shank, while being adapted to transmit turning movement to the screw may at the same time be capable to be easily bowed in any direction by the pull of the anchoring rope.

In testimony whereof I have signed my name to this specification in the presence of two subscribing witnesses.

JOHN SCHROEDER.

Witnesses:
HERMANN HANES,
JAMES L. A. BURRELL.